Figure 1:
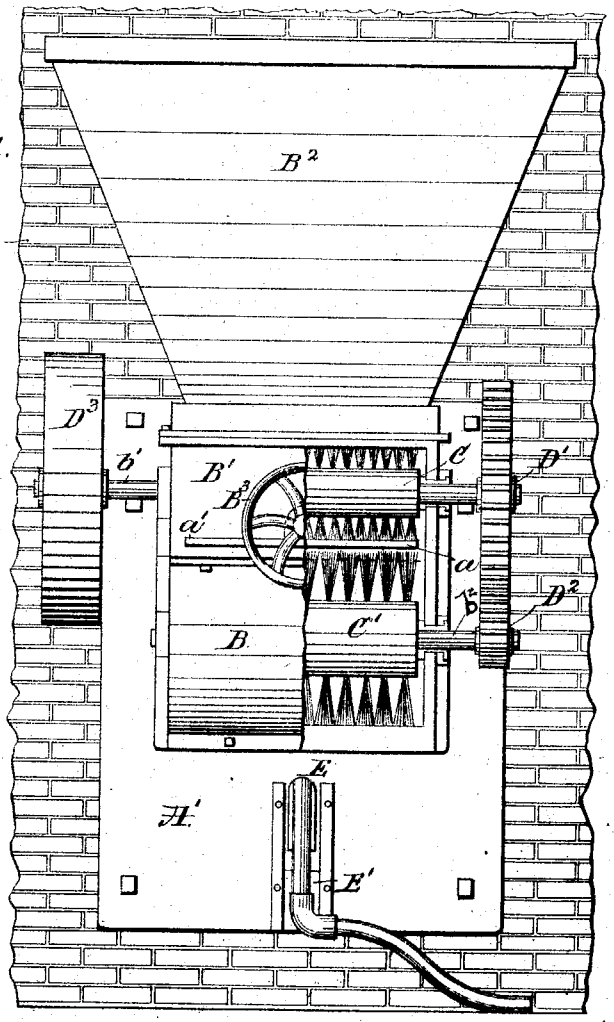

No. 11,964. Reissued Jan. 28, 1902.

F. N. SPEAR.

FUEL FEEDER FOR FURNACES.

(Application filed Sept. 12, 1901.)

Witnesses.
Everett P. Emery
C. S. Webber

Inventor,
Frank N. Spear,
by Frederick L. Emery
Atty.

UNITED STATES PATENT OFFICE.

FRANK N. SPEAR, OF LOS ANGELES, CALIFORNIA.

FUEL-FEEDER FOR FURNACES.

SPECIFICATION forming part of Reissued Letters Patent No. 11,964, dated January 28, 1902.

Original No. 655,464, dated August 7, 1900. Application for reissue filed September 12, 1901. Serial No. 75,153.

*To all whom it may concern:*

Be it known that I, FRANK N. SPEAR, a citizen of the United States, residing at Los Angeles, in the county of Los Angeles and State of California, have invented an Improvement in Fuel-Feeders for Furnaces, of which the following description, in connection with the accompanying drawings, is a specification, like letters on the drawings representing like parts.

The present invention relates to a certain new and useful apparatus for feeding pulverulent fuel, such as coal-dust or finely-comminuted coal, to the combustion-chamber of a furnace in a continuous stream; and it consists in the arrangement of parts and details of construction, as will be hereinafter fully set forth in the drawings, and described and pointed out in the specification.

The object of my invention is to provide a feeder by means of which the fuel may be fed continuously to the combustion-chamber without the employment of a forced draft, as is usual with this class of feeder, and by means of which the dust or finely-comminuted fuel to be delivered to the combustion-chamber shall be reduced to a loose condition prior to being conveyed to the discharge mechanism, the invention comprising a feed-hopper, a rotary feed and loosening roll arranged therein, a fuel-receiving chamber arranged below the feed-hopper, a controlled communication between the feed-hopper and the receiving-chamber, and of a delivery-roll working within the receiving-chamber and by means of which the fuel fed therein is ejected into the combustion-chamber of the furnace.

In order to comprehend the invention, reference must be had to the accompanying sheet of drawings, wherein—

Figure 2:
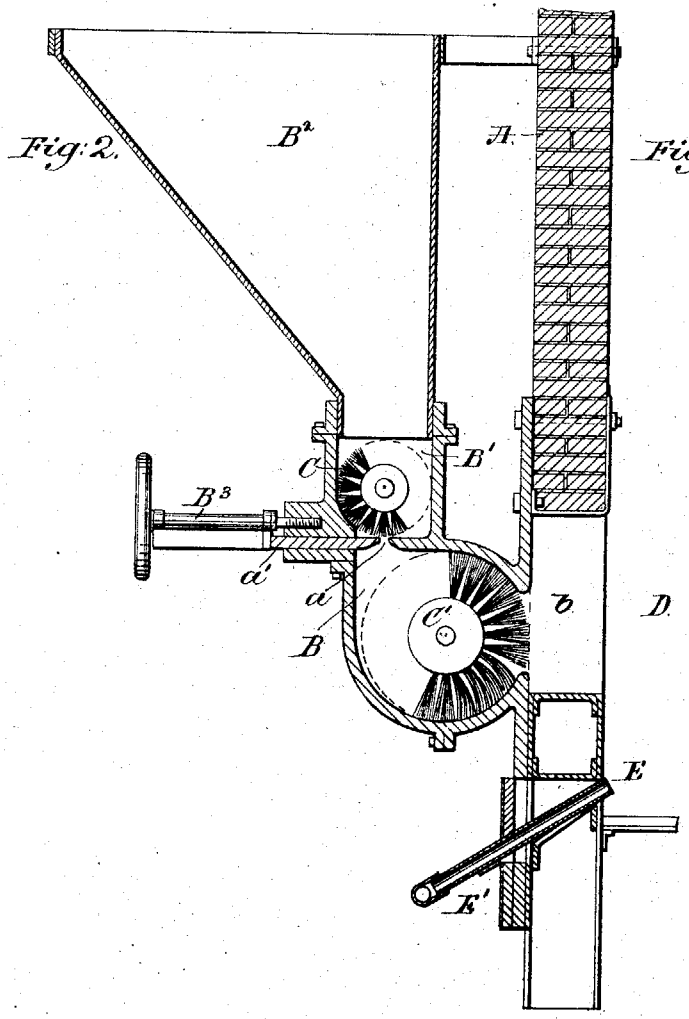

Figure 1 is a front view in elevation, partly broken away; and Fig. 2 is a vertical sectional view in end elevation.

In the drawings the letter A is used to indicate any suitable style of furnace, to the front of which is secured the casing A'. This casing is divided into an upper chamber B' and a lower chamber B, communication being established between the chambers by the passage-way *a*. Said passage-way is controlled by the slide plate *a'*, which plate, as shown, constitutes a part of the bottom of the chamber B' and is moved inward or outward by means of the adjusting-screw $B^3$. The upper chamber B' may be said to constitute the lower portion of the feed-hopper $B^2$, and within said portion of the hopper works the feed and loosening brush C, which brush in the form of my invention here shown is composed of wire. This brush extends the length of the chamber B', and the diameter thereof is approximately the same as the width of the chamber. Consequently the said brush may be said to approximately fill the chamber.

Within the lower chamber B works the delivery-brush C', which brush, like brush C, is preferably composed of wire. Said brush C' extends the length of chamber B, and its diameter is such as to approximately fill the chamber. This brush receives the fuel fed from chamber B' through passage-way *a* into chamber B and delivers the same into the combustion-chamber D through the opening *b* in the front wall of the furnace.

The roll or brush C' is here shown driven from roll or brush C through the medium of the intermeshing gears D' $D^2$, secured to the projecting ends of the shafts *b'* $b^2$, respectively, of rolls or brushes C C'. The upper roll or brush is driven by any suitable power mechanism through the medium of a pulley-belt (not shown) working over pulley $D^3$. Inasmuch as the lower roll or brush is driven or operated from the upper roll or brush the rolls or brushes may be said to work in unison. Consequently the feed or delivery of the fuel from the feed-hopper to the delivery-chamber will be proportionate to the delivery of the fuel into the combustion-chamber. It will be readily understood that instead of driving the lower roll or brush from the upper roll or brush the lower roll or brush may serve to drive the upper roll or brush. If so desired, the speed of the lower roll or brush may be increased or decreased by introducing intermediate gears between the gears D' $D^2$.

The upper roll or brush C not only serves to feed or convey the fuel from the feed-hopper to the passage-way *a*, but also to break up any lumps or large masses of the fine fuel or dust, so as to leave the same in approximately a uniform condition of looseness. By constructing the bristles of the brush of wire a give or resiliency is obtained, which not only permits of an increased loosening strain to be brought to bear upon the pulverulent fuel conveyed to the delivery-chamber, but increases the durability of the brush or roll.

As the lower roll or brush is composed of wire bristles, which, as here shown, are compressed by the wall of the delivery-chamber adjacent its outlet-opening during rotation of the brush or roll, it is obvious that as the wire bristles are carried past the feed-opening *b* the bristles spring outward. This spring of the bristles throws the powdered fuel into the combustion-chamber with considerable force or sufficient force to scatter the fuel well into the combustion-chamber. Being composed of wire, the roll or brush is not affected by the heat of the furnace. In this construction of the feed mechanism the feed of the fuel into the combustion-chamber of the furnace is not dependent upon an air-blast ejected into the powdered fuel. The resilient delivery roll or brush gives sufficient force to the discharged fuel to deliver it at the proper portion of the combustion-chamber.

By means of the slide gate or plate *a'* the opening of the passage-way *a* may be increased or decreased in order to regulate the delivery of the powdered fuel to the chamber B' in proportion to the discharge of the fuel into the combustion-chamber, and the roll or brush C, rotating close to said gate or plate *a'*, insures always a free opening and prevents the fine dust or fuel from clogging above said gate or plate.

In certain cases it is desired to direct the fuel to a given portion of the combustion-chamber. For this purpose a blast of air may be used. In order to meet this requirement, an ejector-nozzle E extends through the front wall of the furnace below the delivery-chamber B, which nozzle is connected or hinged to a slide-plate E'. This plate works in guides secured to the front of the furnace. As the slide-plate E' is raised or lowered the nozzle is likewise moved. This raising or lowering of the nozzle changes the inclination of the air-blast and varies the point of delivery of the fuel discharged into the combustion-chamber.

In operation the coal-dust fed into hopper $B^2$ falls into chamber B' upon rotating roll or brush C and is carried downward and delivered by said brush or roll to passage-way *a*, through which it falls into chamber B back of and onto delivery roll or brush C'. The rotation of this brush or roll C' conveys the powdered fuel toward and through the feed-opening *b*. As this opening is reached the resiliency of the wire bristles of roll or brush C' aids in throwing or ejecting the fuel into the combustion-chamber a considerable distance from the front wall of the furnace. In case it is desired to convey the ejected fuel to any given portion of the combustion-chamber the ejector-nozzle is regulated so as to permit of a current of air impinging against the body of ejected fuel at such an angle as to place the fuel at the desired point. By operating the adjusting-screw B' the slide plate or gate *a'* may be moved inward or outward, so as to decrease or increase the passage-way *a*, in order to regulate the quantity of the coal-dust acted upon by the roll C, that shall be permitted to pass into the delivery-chamber, which quantity should correspond with the desired discharge of the fuel into the combustion-chamber of the furnace.

It will be observed that the feed of the fuel into the combustion-chamber is a continuous one and not intermittent and that the feed of the fuel to the delivery mechanism is likewise a continuous one and proportionate to the discharge of the fuel to the furnace.

Having thus described my invention, what I claim as new, and desire to secure protection in by Letters Patent, is—

1. In a furnace-feeder, the combination with a casing having a feed-chamber and a delivery-chamber, a controlled fuel passage-way between the chambers, a rotary feed-brush arranged within the feed-chamber for causing a continuous feed of fuel to the delivery-chamber, a delivery-brush arranged within the delivery-chamber and compressed by a wall thereof adjacent the discharge-opening by which the fuel is ejected directly into the combustion-chamber, and of means for imparting rotary motion to the said brushes.

2. In a furnace-feeder, the combination with a casing having a feed-chamber and a delivery-chamber, a fuel passage-way between the chambers, a rotary feed-brush arranged within the feed-chamber for causing a continuous feed of fuel to the delivery-chamber, a delivery-brush arranged within the delivery-chamber, and compressed by a wall thereof adjacent the discharge-opening by means of which the fuel is ejected directly into the combustion-chamber, and of means for imparting rotary motion to the said brushes.

3. The combination with a combustion-chamber, of a pulverulent-fuel feeder comprising a feed-chamber and a delivery-chamber within which the fuel is delivered, rotary means arranged within the feed-chamber for causing continuous delivery of the fuel to the delivery-chamber, a resilient delivery-brush arranged within said delivery-chamber so as to contact with a part near the delivery-opening causing the brush to spring and positively throw the fuel directly into the combustion-chamber, and of means for imparting rotation to the delivery-brush.

4. In a fuel-feeder, the combination with a combustion-chamber, a fuel-delivery chamber communicating therewith, a yielding delivery-brush in the delivery-chamber, and means for compressing the brush adjacent the delivery-opening for throwing the fuel into the combustion-chamber, and means for rotating said brush, substantially as described.

5. In a fine-fuel feeder for furnaces, the combination of a casing having a feed-chamber and a delivery-chamber communicating by means of a passage, a rotary feed-brush in said feed-chamber and acting to cause a continuous feed of fuel to the delivery-chamber, a rotary delivery-brush so arranged in said delivery-chamber that a space is afforded for the fuel from the receiving-chamber and to engage a part of the wall near the delivery-opening of the chamber to cause said brush to spring and positively throw the fuel from the delivery-chamber, and means for rotating the brushes, substantially as described.

6. In a pulverulent or dust fuel feeder, the combination of a feed-hopper for the pulverulent or dust fuel, a rotary feed and loosening roll arranged in the bottom thereof, to provide substantially continuous feed of fuel from said hopper, a fuel-receiving chamber arranged below the feed-hopper, a controlled communication between the feed-hopper and the receiving-chamber and a delivery-roll working within the receiving-chamber and provided with closely-arranged feeding projections by means of which the fuel fed therein is ejected substantially continuously into the combustion-chamber of the furnace.

7. In a pulverulent or dust fuel feeder, the combination of a feed-hopper for the pulverulent or dust fuel, a receiving-chamber below and in communication with it, a feed-controlling device in the bottom of said hopper to regulate the flow of material therefrom to said chamber, a rotary feed and loosening roll arranged in the bottom of said hopper and running close to said controlling device to provide substantially continuous free feed from said hopper and above said device, and a delivery-roll working in said receiving-chamber and provided with closely-arranged feeding projections to deliver the fuel substantially continuously into the combustion-chamber.

In witness whereof I have hereunto set my hand.

FRANK N. SPEAR.

Witnesses:
FREDERICK L. EMERY,
EVERETT L. EMERY.